United States Patent
Khazeni et al.

(10) Patent No.: US 10,627,957 B2
(45) Date of Patent: Apr. 21, 2020

(54) ACTIVE AVOIDANCE OF DISPLAY NOISE IN SIMULTANEOUS TOUCH AND DISPLAY

(71) Applicant: SYNAPTICS INCORPORATED, San Jose, CA (US)

(72) Inventors: Kasra Khazeni, San Jose, CA (US); Joseph Kurth Reynolds, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 163 days.

(21) Appl. No.: 15/892,161

(22) Filed: Feb. 8, 2018

(65) Prior Publication Data
US 2018/0239493 A1 Aug. 23, 2018

Related U.S. Application Data

(60) Provisional application No. 62/462,096, filed on Feb. 22, 2017.

(51) Int. Cl.
*G06F 3/041* (2006.01)
*G06F 3/044* (2006.01)

(52) U.S. Cl.
CPC ........... *G06F 3/0418* (2013.01); *G06F 3/044* (2013.01); *G06F 3/0412* (2013.01); *G06F 2203/04107* (2013.01)

(58) Field of Classification Search
CPC ...... G06F 3/0418; G06F 3/044; G06F 3/0412; G06F 3/0416; G06F 3/04184; G06F 2203/04107
See application file for complete search history.

(56) References Cited

U.S. PATENT DOCUMENTS

| | | | |
|---|---|---|---|
| 9,209,802 B1* | 12/2015 | Maharyta | H03K 17/955 |
| 9,244,550 B2* | 1/2016 | Singh | G06F 3/041 |
| 2013/0050144 A1* | 2/2013 | Reynolds | G06F 3/0416 345/174 |
| 2014/0078104 A1* | 3/2014 | Lee | G06F 3/044 345/174 |
| 2014/0125623 A1* | 5/2014 | Atkinson | G06F 3/044 345/174 |
| 2014/0232663 A1* | 8/2014 | Singh | G06F 3/041 345/173 |
| 2015/0091864 A1* | 4/2015 | Reynolds | G06F 3/044 345/174 |
| 2017/0060337 A1* | 3/2017 | Kim | G06F 3/0418 |
| 2017/0090641 A1 | 3/2017 | Khazeni et al. | |
| 2017/0090671 A1 | 3/2017 | Khazeni et al. | |

(Continued)

*Primary Examiner* — Ricardo Osorio
(74) *Attorney, Agent, or Firm* — Patterson + Sheridan, LLP

(57) ABSTRACT

Embodiments described herein include a method for avoiding display noise in a capacitive touch sensing device that includes sensing a touch input in a sensing region of an input device at a first touch sensing frequency. The method also includes analyzing incoming display data for display data noise at the first touch sensing frequency and at a second touch sensing frequency. If the display data noise at the first touch sensing frequency is higher than a threshold, touch sensing frequency is adjusted to the second touch sensing frequency where the display data noise is lower than the threshold. If the display data noise at the first touch sensing frequency is lower than the threshold, sensing is continued at the first touch frequency.

19 Claims, 8 Drawing Sheets

(56) References Cited

U.S. PATENT DOCUMENTS

| | | | |
|---|---|---|---|
| 2017/0115824 A1* | 4/2017 | Katsurahira | G06F 3/044 |
| 2017/0192554 A1 | 7/2017 | Khazeni et al. | |
| 2017/0192591 A1* | 7/2017 | Jang | G06F 3/03545 |
| 2017/0285172 A1* | 10/2017 | Babitch | G01S 19/21 |
| 2018/0364861 A1* | 12/2018 | Gray | H03M 3/458 |
| 2019/0012034 A1* | 1/2019 | Liang | G06F 3/0418 |
| 2019/0163320 A1* | 5/2019 | Park | G06F 3/03545 |
| 2019/0227692 A1* | 7/2019 | Kim | G06F 3/041 |

\* cited by examiner

ACTIVE AVOIDANCE OF DISPLAY NOISE IN SIMULTANEOUS TOUCH AND DISPLAY

CROSS-REFERENCE TO RELATED APPLICATIONS

This application claims benefit of U.S. provisional patent application Ser. No. 62/462,096, filed Feb. 22, 2017, entitled "ACTIVE AVOIDANCE OF DISPLAY NOISE IN SIMULTANEOUS TOUCH AND DISPLAY", which is herein incorporated by reference in its entirety.

BACKGROUND

Field of the Disclosure

Embodiments of the present invention generally relate to a method and apparatus for touch sensing, and more specifically, to avoiding noise in an input device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments described herein include a method for avoiding display noise in a capacitive touch sensing device that includes sensing a touch input in a sensing region of an input device at a first touch sensing frequency. The method also includes analyzing incoming display data for display data noise at the first touch sensing frequency and a second touch sensing frequency. If the display data noise at the first touch sensing frequency is higher than a threshold, the touch sensing frequency is adjusted to the second touch sensing frequency where the display data noise is lower than the threshold. If the display data noise at the first touch sensing frequency is lower than the threshold, sensing is continued at the first touch frequency.

In another embodiment, an input device for capacitive touch sensing comprises a capacitive touch sensor configured to sense a touch input in a sensing region at a first touch sensing frequency. The input device also includes a processing system configured to analyze incoming display data for display data noise at the first touch sensing frequency and at a second touch sensing frequency. If the display data noise at the first touch sensing frequency is higher than a threshold, the processing system adjusts the touch sensing frequency to the second touch sensing frequency where the display data noise is lower than the threshold. If the display data noise at the first touch sensing frequency is lower than the threshold, the processing system continues sensing at the first touch frequency.

In another embodiment, a processing system for avoiding display noise in a capacitive touch sensing device comprises a receiver module configured to sense a touch input in a sensing region at a first touch sensing frequency. The processing system further comprises processing circuitry configured to analyze incoming display data for display data noise at the first touch sensing frequency and at a second touch sensing frequency. If the display data noise at the first touch sensing frequency is higher than a threshold, the processing circuitry adjusts the touch sensing frequency to the second touch sensing frequency where the display data noise is lower than the threshold. If the display data noise at the first touch sensing frequency is lower than the threshold, the processing circuitry continues sensing at the first touch frequency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
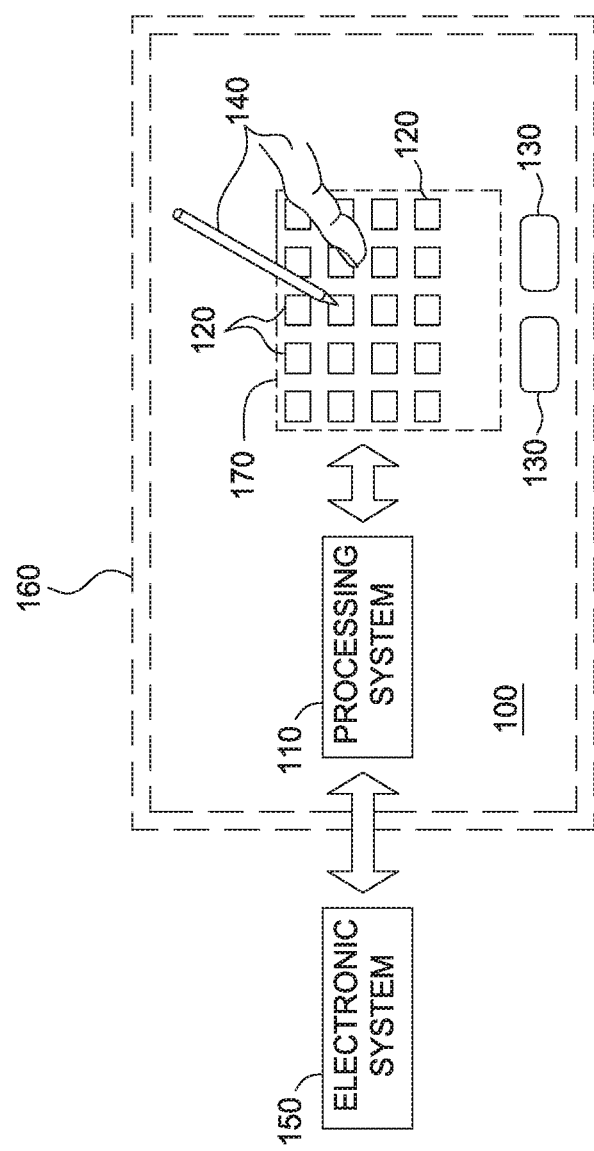
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously provide techniques for avoiding noisy touch sensing frequencies in a system that simultaneously drives touch and display. Display data is analyzed before it is sent to a display to determine at which frequencies noise may occur. If display data noise will occur at the frequency that is currently used for touch sensing, the touch sensing frequency can be adjusted to avoid the incoming display data noise. In addition, the incoming display data noise can be monitored and predicted at a discrete number of potential touch sensing frequencies by analyzing the display data. If the touch sensing frequency needs to be adjusted away from a noisy region, the touch sensing frequency can be shifted to another frequency where display data noise is projected to be below a threshold. Circuitry for performing these operations can be embodied in one or more chips.

Turning now to the figures, FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include Inter-Integrated Circuit (I²C), Serial Peripheral Interface (SPI), Personal System/2 (PS/2), Universal Serial Bus (USB), Bluetooth®, Radio Frequency (RF), and Infrared Data Association (IrDA) communication protocols.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, in some embodiments, sensing input may comprise no contact with any surfaces of the input device 100, contact with an input surface (e.g. a touch surface) of the input device 100, contact with an input surface of the input device 100 coupled with some amount of applied force or pressure, an active modulated input (e.g. an active stylus) and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets as sensor electrodes, which may be uniformly resistive, while others utilize arrays of "finger" electrodes (e.g., 126A-126N illustrated in FIG. 3B) that also create fringing fields to a sheet below for display purposes.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be electrically modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile device such as a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system 150. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. Processing system 110 may also filter the electrical signals to estimate interference outside of the system (e.g., finger coupled noise, etc.) at the sensing frequency to help select an appropriately low noise set of frequencies.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
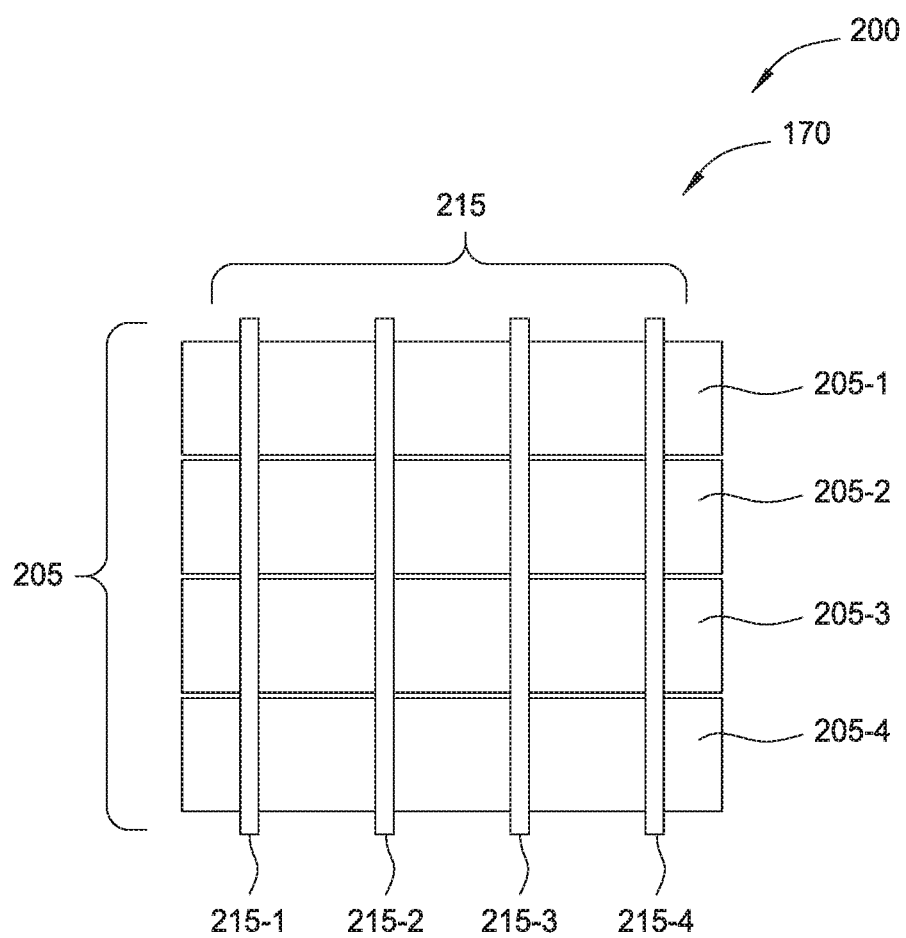
FIGS. 2A, 2B, 3A, and 3B illustrate portions of exemplary sensor electrode implementations, according to embodiments described herein.
Figure 2B:
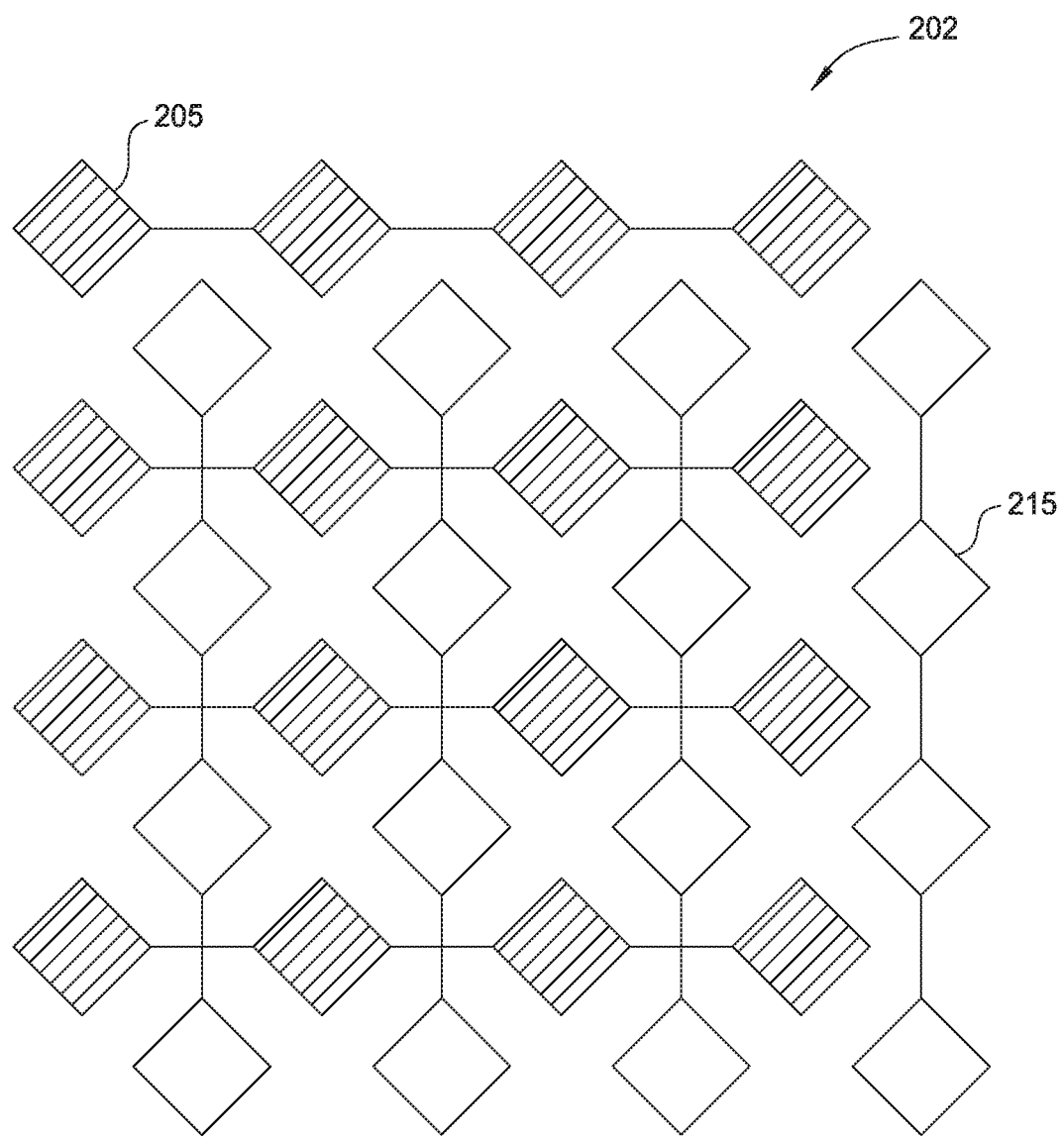

FIGS. 2A, 2B, 3A, and 3B illustrate portions of exemplary sensor electrode arrangements, according to embodiments described herein. Specifically, arrangement 200 (FIG. 2A) illustrates a portion of a pattern of sensor electrodes configured to sense in a sensing region 170 associated with the pattern, according to several embodiments. For clarity of illustration and description, FIG. 2A shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other where they cross over each other (e.g. using a separate insulating substrate or with jumpers or "bridges" of a separate conductor over an insulator deposited on the same substrate). In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape. For example, as shown in the portion of an electrode pattern 202 illustrated in FIG. 2B, sensor electrodes 205 and/or 215 may comprise a diamond shape.

In one embodiment as shown in FIG. 2A, the first plurality of sensor electrodes 205 extends substantially in a first direction while the second plurality of sensor electrodes 215 extends substantially in a second direction. For example, and as shown in FIG. 2A, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer (e.g., OLED TFE—Thin Film Encapsulation), a thin-film transistor (TFT) glass layer, and a backlight layer. However, other implementations of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing, and these operations can be performed simultaneously in some embodiments.

Figure 3A:
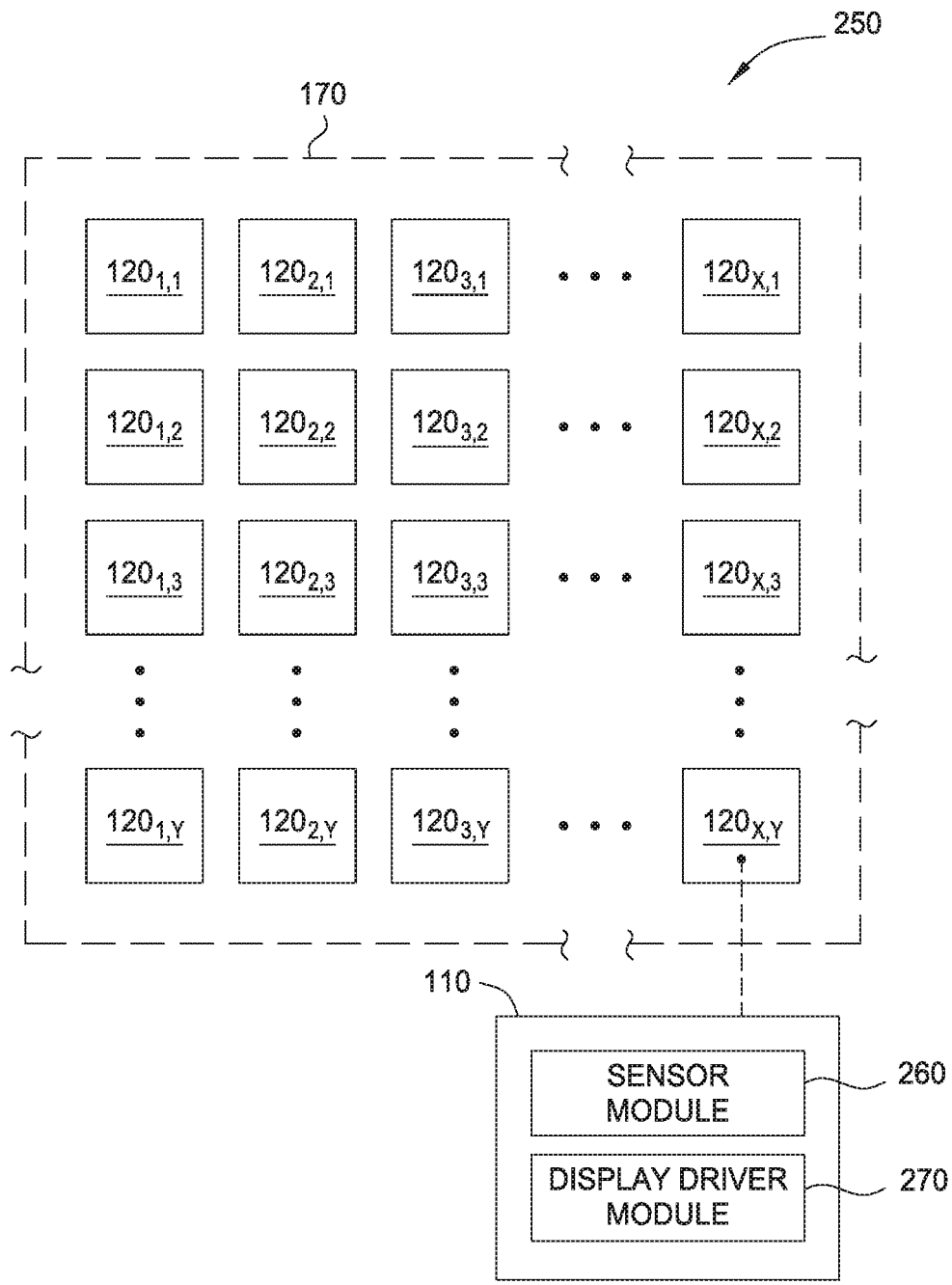

Arrangement 250 of FIG. 3A illustrates a portion of a pattern of sensor electrodes configured to sense in sensing region 170, according to several embodiments. For clarity of illustration and description, FIG. 3A shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable implementation. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement 250 of sensor electrodes 120 ($120_{1,1}$, $120_{2,1}$, $120_{3,1}$, . . . , $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

Figure 3B:
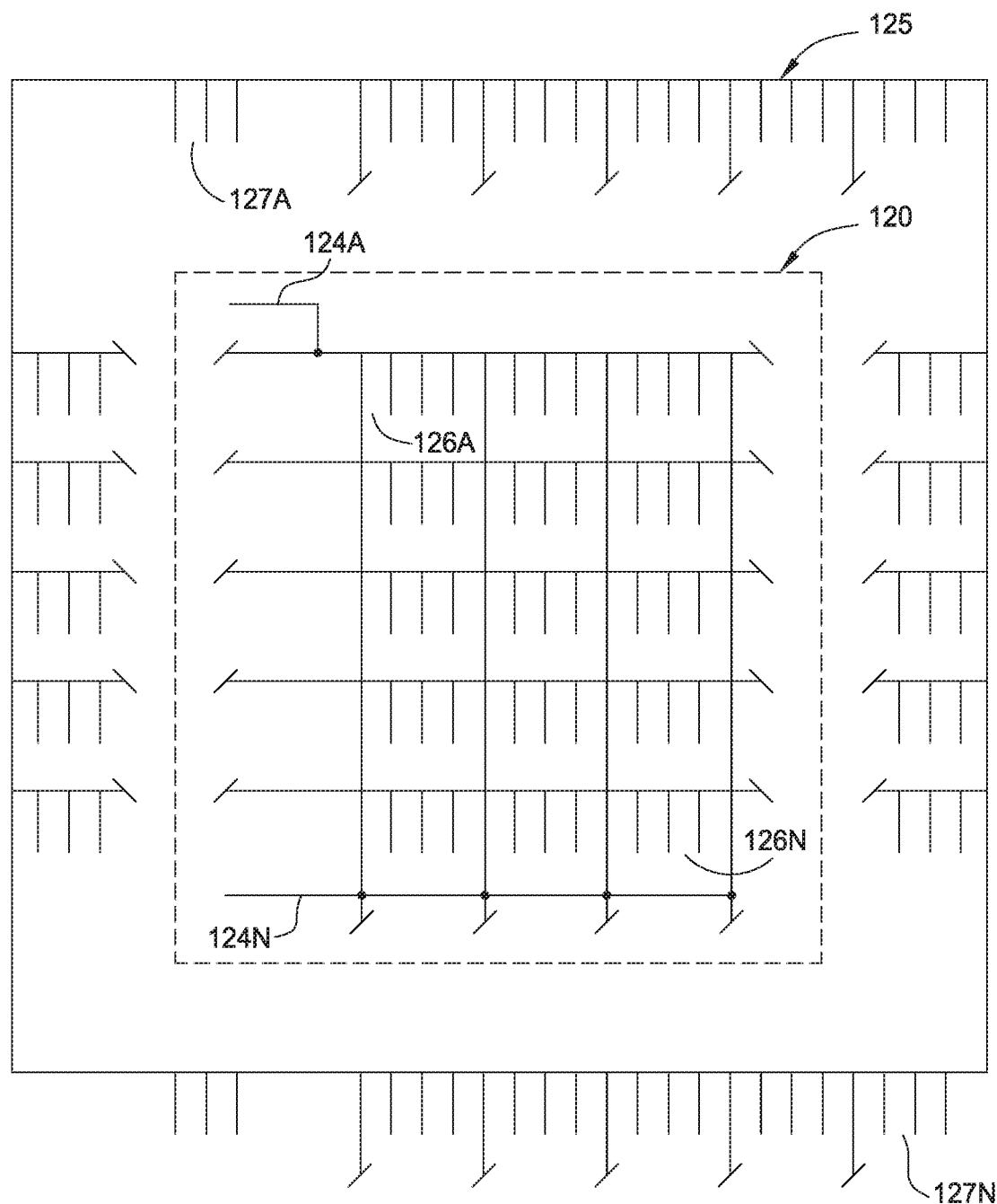

In some embodiments, the arrangement 250 includes one or more grid electrodes 125 that are disposed between at least two of the sensor electrodes 120, as illustrated in FIG. 3B. The grid electrode(s) 125 may at least partially circumscribe the plurality of sensor electrodes 120 as a group, and may also, or in the alternative, completely or partially circumscribe one or more of the sensor electrodes 120. In one embodiment, the grid electrode 125 is a planar body having a plurality of apertures with sensor electrodes 120 circumscribed, where each aperture circumscribes a respective one of the sensor electrodes 120. In other embodiments, the grid electrode(s) 125 comprise a plurality of segments that may be driven individually or in groups or two or more segments of rows, columns, or both. The grid electrode(s) 125 may be fabricated similar to the sensor electrodes 120. The grid electrode(s) 125, along with sensor electrodes 120, may be coupled to the processing system 110 utilizing conductive routing traces and used for input object detection. In one embodiment, one or more vias 124A to 124N may couple one or more rows and/or one or more columns.

The sensor electrodes 120 are typically ohmically isolated from each other, and are also ohmically isolated from the grid electrode(s) 125. That is, one or more insulators separate the sensor electrodes 120 and grid electrode(s) 125 and prevent them from electrically shorting to each other. The sensor electrodes 120 may be patterned as a group of electrodes in an array (for example, when they are combined touch and display updating electrodes, i.e., a group of display subpixels), as illustrated in FIG. 3B. FIG. 3B illustrates one sensor electrode 120 with 5 rows and 3 columns of patterned subpixels 126A-126N surrounded by a grid electrode 125 made of finger electrodes (e.g. for IPS or FFS LCDs). Grid electrode 125 may also comprise any number of patterned subpixels 127A-127N. In some embodiments, the sensor electrodes 120 and grid electrode(s) 125 are separated by an insulative gap, which may be filled with an electrically insulating material (e.g., liquid crystal, organic dielectric, silicon oxide dielectric, etc.), or may be an air gap. In some embodiments, the sensor electrodes 120 and the grid electrode(s) 125 are vertically separated by one or more layers of insulative material. In some other embodiments, the sensor electrodes 120 and the grid electrode(s) 125 are separated by one or more substrates; for example, they may be disposed on opposite sides of the same substrate, or on different substrates. In yet other embodiments, the grid electrode(s) 125 may be composed of multiple layers on the same substrate, or on different substrates. In one embodiment, a first grid electrode 125 may be formed on a first substrate (or a first side of a substrate) and a second grid electrode 125 may be formed on a second substrate (or a second side of a substrate). For example, a first grid electrode 125 comprises one or more common electrodes disposed on a thin-film transistor (TFT) layer of the display device 160 (FIG. 1) and a second grid electrode 125 is disposed on the color filter glass of the display device 160. The dimensions of the first and second grid electrodes 125 can be equal or differ in at least one dimension.

In a second mode of operation, the sensor electrodes 120 ($120_{1,1}$, $120_{2,1}$, $120_{3,1}$, . . . , $120_{X,Y}$) may be utilized to detect the presence of an input object via transcapacitive sensing techniques when a transmitter signal is driven onto the grid electrode(s) 125. That is, processing system 110 is configured to drive the grid electrode(s) 125 with a transmitter signal and to receive resulting signals with each sensor electrode 120, where a resulting signal comprising effects corresponding to the transmitter signal, which is utilized by the processing system 110 or other processor to determine the position of the input object. When the first mode of absolute capacitive sensing is used the grid electrode 125 may be ground to the touch electrodes 120.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage (e.g., through user input) in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. Both transmitters and receivers may be multiplexed such that all transmitters may be modulated (e.g., code division multiplexing) or only a subset of transmitters may be modulated (e.g., time division multiplexing). Alternatively, all receivers may be multiplexed (e.g., time division multiplexing). In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or more sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes 120 may be selected based on, but not limited to, an application running on the host processor, a status of the input device 100, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects 140 entering, exiting, and within the sensing region.

In any of the above embodiments, multiple sensor electrodes 120 may be ganged together such that the sensor electrodes 120 are simultaneously modulated or simultaneously used to receive. As compared to the methods described above, ganging together multiple sensor electrodes 120 may produce a coarse capacitive image that may not be usable to discern precise positional information. However, a coarse capacitive image may be used to sense presence of an input object and/or used to determine when to scan (e.g., an active pen). In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The baseline may also be used to exclude user input but track drift. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture and thus a filtered (e.g. low pass) capacitive image may form an estimate of the baseline.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. One embodiment is illustrated in FIG. 3B. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (e.g. OLED Cathode), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Referring to FIG. 3A, the processing system 110 coupled to the sensor electrodes 120 includes a sensor module 260 and optionally, a display driver module 270. The sensor module 260 includes circuitry configured to drive at least one of the sensor electrodes 120 for capacitive sensing during periods in which input sensing is desired. In one embodiment, the sensor module 260 is configured to drive a modulated signal onto the at least one sensor electrode 120 to detect changes in absolute capacitance between the at least one sensor electrode 120 and an input object 140. In another embodiment, the sensor module 260 is configured to drive a transmitter signal onto the at least one sensor electrode 120 to detect changes in a transcapacitance between the at least one sensor electrode and another sensor electrode 120. The modulated absolute signal and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated absolute signals, transmitter signals and/or guard signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 260 may be selectively coupled one or more of the sensor electrodes 120 and/or the grid electrode(s). For example, the sensor module 260 may be coupled to selected portions of the sensor electrodes 120 and operate in either an absolute or transcapacitive sensing mode. In another example, the sensor module 260 may be a different portion of the sensor electrodes 120 and operate in either an absolute or transcapacitive sensing mode. In yet another example, the sensor module 260 may be coupled to all the sensor electrodes 120 and operate in either an absolute or transcapacitive sensing mode.

The sensor module 260 is configured to operate the grid electrode(s) as a guard electrode that may shield sensor electrodes 120 from the electrical effects of nearby conductors. In one embodiment, the processing system is configured to operate the grid electrode(s) as a shield electrode that may "guard" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (La, non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes 120. In other embodiment, the shielding signal may be referred to as a "guarding signal" where the guarding signal is a varying voltage signal having at least one of a similar phase and amplitude as the modulated signal driven on to the sensor electrodes 120. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 260 and display driver module 270 to provide accurate control of overlapping display updating and capacitive sensing periods with repeatably coherent frequencies and phases (e.g. using the H-Sync or V-Sync display signals corresponding to the phase of a gate line update or display frame update). In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 260 includes circuitry configured to receive resulting signals with the sensor electrodes 120 and/or grid electrode(s) comprising effects corresponding to the modulated signals or the transmitter signals during periods in which input sensing is desired. The sensor module 260 may determine a position of the input object in the sensing region 170 or may provide a signal including information indicative of the resulting signal to another module or processor, for example, a determination module or a processor of an associated electronic system 150 (i.e., a host processor), for determining the position of the input object 140 in the sensing region 170.

The display driver module 270 may be included in or separate from the processing system 110. The display driver module 270 includes circuitry configured to provide display image update information to the display of the display device 160 during non-sensing (e.g., display updating) periods.

In one embodiment, the processing system 110 comprises a first integrated controller comprising the display driver module 270 and at least a portion of the sensor module 260 (i.e., transmitter module and/or receiver module). In another embodiment, the processing system 110 comprises a first integrated controller comprising the display driver module 270 and a second integrated controller comprising the sensor module 260. In yet another embodiment, the processing system comprises a first integrated controller comprising display driver module 270 and a first portion of the sensor module 260 (e.g., one of a transmitter module and a receiver module) and a second integrated controller comprising a second portion of the sensor module 260 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Figure 4:
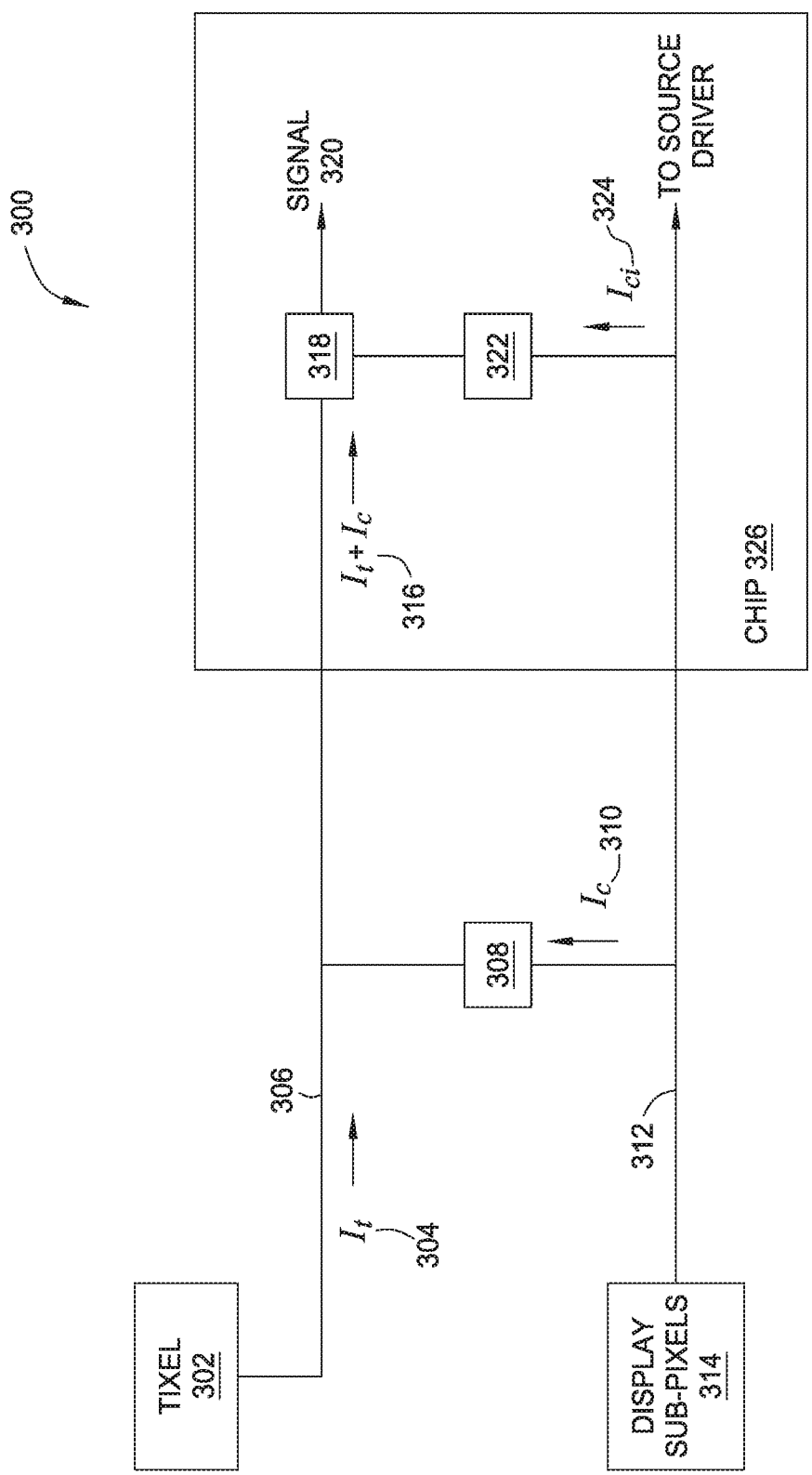
FIG. 4 illustrates an example system for simultaneous touch and display, according to embodiments described herein.

FIG. 4 illustrates exemplary circuitry 300 for simultaneous touch and display. That is, display driver module 270 updates the display while sensor module 260 simultaneously senses inputs. In circuitry 300, touch sensing occurs at a specific frequency, which can be adjusted, and display updates occur at another specific frequency. The touch sensing frequency and its phase with respect to the display update frequency are locked. Typically, the relationship between the touch sensing frequency and the display update frequency creates a few low-noise regions of frequency where the touch sensing frequency can be set (known as "parking" frequencies). A larger set of parking frequencies may be chosen during development or during production programming of the sensor, and a subset may be chosen based on estimated external (e.g. not display related) interference. The incoming display data can be analyzed (e.g. using an FFT, a Geortzel transform, etc.) for noise in the frequency space only for those regions of frequency where the touch sensing frequency can be set (e.g. a subset of the possible parking frequencies). The analysis may be done using sequential digital line data stored in a display driver without requiring a display frame buffer. Alternatively, the incoming display data may be analyzed by mixing and filtering of the analog display data outputs. If the frequency component of the incoming display data calculated for the few parking frequencies is higher than a threshold for any specific parking frequency, the touch sensing frequency can be set to avoid the parking frequencies that are over the threshold to avoid the incoming display data noise.

Circuitry 300 illustrates a touch pixel ("tixel") 302 that represents a single sensor of an array of sensors. Tixel 302 detects the capacitance between an input object 140 (such as a user's finger) and tixel 302. Detection of the input object 140 occurs via voltage modulation of the array of sensors. The capacitance between the input object 140 and tixel 302 creates a tixel current $I_t$ 304 through tixel routing 306 to integrator 318 inside chip 326. Tixel routing 306 represents the conductive paths that carry current back and forth between the array of tixels 302 and chip 326. Integrator 318 integrates signals from the array of tixels 302 and outputs a signal 320 to processing system 110 for processing.

Chip 326 comprises processing circuitry for both touch sensing and display driving. A source driver drives a panel of display sub-pixels 314 to display an image. Signals representative of the image are transmitted to display sub-pixels 314 via sub-pixel routing 312. Because sub-pixel routing 312 and tixel routing 306 comprise conducting wires and/or traces that are close to one another inside a chip, corrupting currents may be generated. When a voltage on sub-pixel routing 312 changes to update the display, capacitive coupling between sub-pixel routing 312 and tixel routing 306 causes a coupling current, $I_c$ 310, to appear on tixel routing 306. Coupling impedance 308 creates coupling current $I_c$ 310, and coupling current $I_c$ 310 is added to tixel current $I_t$ 304 to create total current $I_t+I_c$ 316, which is received by integrator 318. The coupling current $I_c$ 310 therefore corrupts the signal collected by tixel 302 during display updates, which can lead to corruption in signal 320. Corruption in signal 320 can result in errors in touch detection by processing system 110.

The sub-pixel routing 312 can also cause a coupling current that is internal to chip 326 in some embodiments. Coupling impedance 322 creates internal coupling current $I_{ci}$ 324 in chip 326. $I_{ci}$ 324 is received by integrator 318, and therefore $I_{ci}$ 324 can also corrupt the signal from tixel 302.

For certain images that are transmitted for display on display sub-pixels 314, frequency of the corrupting current is in band with the tixel modulation frequency. This in turn shows up as noise that corrupts the signal in tixel current $I_t$ 304. Chip 326 can change the touch sensing frequency to avoid this display noise. However, the new touch sensing frequency may also be susceptible to noise from the incoming display data. To avoid switching to a frequency that is susceptible to incoming display data noise, chip 326 can monitor incoming display data according to embodiments described herein and avoid touch sensing frequencies that might be corrupted by incoming display data noise. The analysis of incoming display data can be performed by processing circuitry using a Goertzel algorithm (also known as a Goertzel transform) that analyzes the incoming display data at each parking frequency over a touch sensing sample period (or substantial fraction thereof), as described in further detail below. The incoming display data can be analyzed while the data is stored in a buffer before the data is sent to the display.

Figure 5:
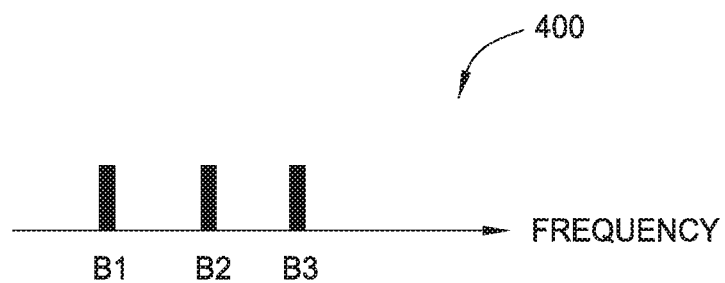
FIG. 5 illustrates example parking frequencies on a frequency axis.

FIG. 5 illustrates three parking frequencies B1, B2, and B3 on a frequency axis 400. The parking frequencies are small bands of allowed frequencies in this embodiment. That is, some previous tuning or analysis of the combination touch/display system has been performed and it was determined that parking frequencies B1, B2, and B3 may be used by chip 326 as touch sensing frequencies. The actual frequency that can be used for touch sensing varies somewhat around the quantized values of B1, B2, and B3. For example, if B1 is 180 kHz (kilohertz), chip 326 does not have to use 180 kHz exactly but may instead use 179.5 kHz, 180.6 kHz, etc., as the touch sensing frequency. Any number of parking frequencies may be utilized in other embodiments. Because chip 326 has a list of parking frequencies that may be utilized for touch sensing, chip 326 can analyze incoming display data for noise only at those specific parking frequencies. If the noise from the incoming display data is going to interfere with the active touch sensing frequency when the display data is sent to the display, chip 326 can switch touch sensing frequencies to another parking frequency that is not susceptible to corruption by the incoming display data. Then, when the incoming display data is transmitted to display sub-pixels 314, chip 326 has switched the touch sensing frequency to the new frequency and the noise is actively avoided. Chip 326 can continually monitor incoming display data and make adjustments to the touch sensing frequency as needed to avoid display data noise.

Figure 6:
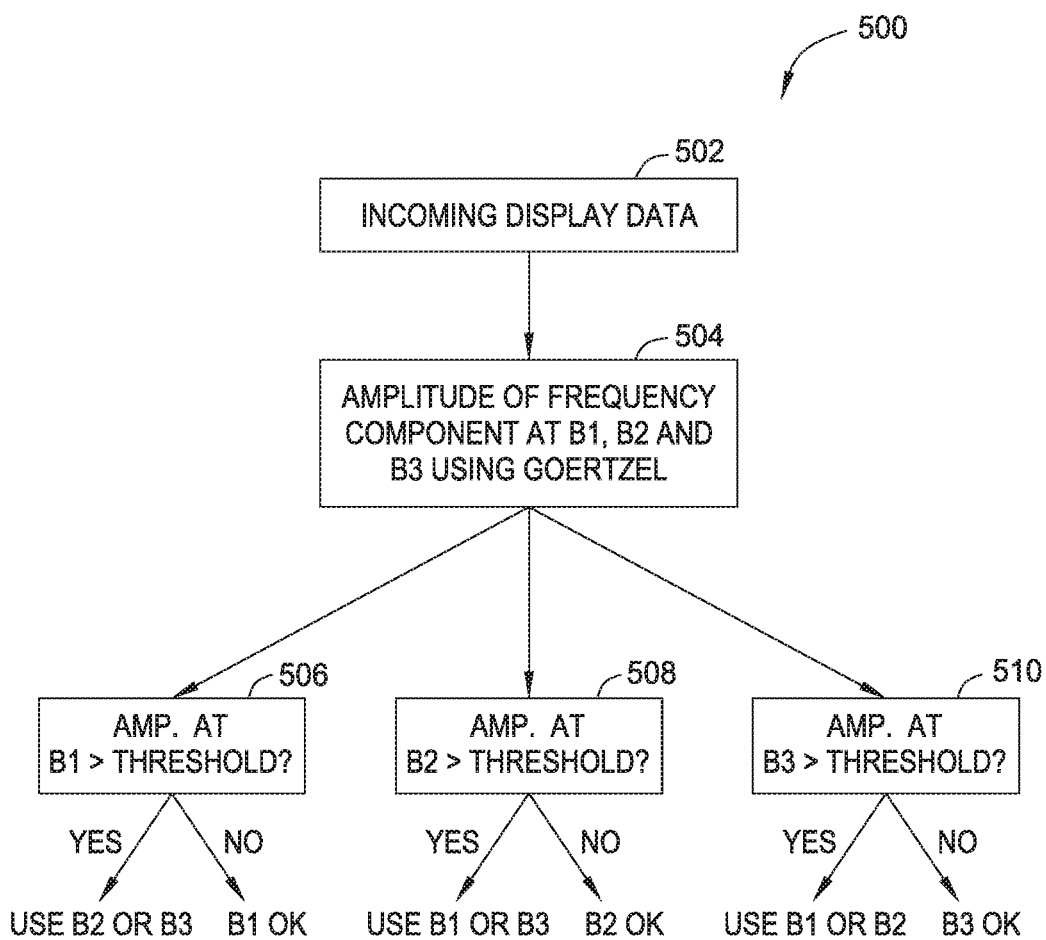
FIG. 6 illustrates an example decision tree for avoiding display data noise.

FIG. 6 illustrates an example decision tree 500 for avoiding display data noise. In this example, three parking frequencies B1, B2, and B3 are available for use as touch sensing frequencies. Incoming display data may be stored in a buffer at step 502 before being transmitted to display sub-pixels 314 for display. In this example, B1 is the current active touch sensing frequency.

At step 504, chip 326 calculates the amplitude of the frequency component of the incoming display data for the parking frequencies B1, B2, and B3. In other embodiments, any suitable component can be used to calculate these amplitudes, such as a CPU, firmware, another chip, etc. In this example, a Geortzel algorithm is used to calculate the amplitudes. The Goertzel algorithm analyzes one selectable frequency component from a discrete signal at a time. When used to compute a small number of selected frequency components, the Goertzel algorithm is more efficient than a fast Fourier transform (FFT), which analyzes a larger range of frequencies. Because of its simple structure, and because only the parking frequencies will be analyzed, the Goertzel algorithm provides an efficient and fast method to calculate the amplitudes of the frequency components of the incoming display data. The fast, efficient Goertzel algorithm can therefore be used to continually monitor the incoming display data before it is sent to the display and adjust the touch sensing frequency to avoid incoming display noise. The Goertzel algorithm is also simple enough to be performed in firmware or with a lower-power chip or processor (or processing circuitry embodied in one or more chips), while still being performed in real-time to keep up with incoming display data.

After step 504 is performed, the amplitudes of the frequency components of the incoming display data are known at the parking frequencies B1, B2, and B3. A threshold for noise can be predetermined for the system. If the noise associated with specific incoming display data at a given parking frequency is above the threshold, that frequency is unacceptable and another frequency should be selected for touch sensing while the specific incoming display data is transmitted to the display and displayed. For example, at step 506, chip 326 determines if the amplitude of noise at frequency B1 is greater than the predetermined threshold. If the noise is below the threshold, frequency B1 is OK and can remain the current active touch sensing frequency. If the noise is above the threshold, chip 326 can switch the touch sensing frequency to B2 or B3 to avoid the incoming display data noise. As noted above, the Goertzel algorithm is fast and efficient enough to be performed on all parking frequencies for each buffer of incoming display data in real time. Therefore, chip 326 can determine that the noise of the incoming display data is below the threshold for B2 or B3 before switching touch sensing frequencies to B2 or B3. Decision tree 500 is used to predict which touch sensing frequencies the chip 326 should avoid in order to avoid the incoming display noise.

Steps 508 and 510 are similar to step 506. At step 508, chip 326 determines whether the amplitude of incoming display data noise at frequency B1 is greater than the predetermined threshold. If the noise is greater, then frequencies B1 or B3 should be used instead of B2. That is, if the touch sensing frequency is currently B2, chip 326 will move the touch sensing frequency to another parking frequency. If the touch sensing frequency is not B2 at this point in time, chip 326 will not select parking frequency B2 if the touch sensing frequency needs to be moved.

If the noise determined in step 508 is below the threshold, parking frequency B2 is acceptable. If the current touch sensing frequency is B2, touch sensing can continue at frequency B2. If the current touch sensing frequency is not B2, but the current touch sensing frequency needs to be moved, chip 326 can move touch sensing to frequency B2.

At step 510, a similar determination is made with respect to parking frequency B3. As noted above, any suitable number of parking frequencies may be used, so the calculations made with respect to FIG. 6 can be repeated as necessary if there are more than three parking frequencies. Beneficially, because the Goertzel algorithm is only analyzing the incoming display data for noise at specific frequencies, incoming display data can be continually monitored for noise at all available parking frequencies.

In another embodiment, the calculations performed in FIG. 6 may be used to adjust the touch sensing frequency even if incoming display data noise will not interfere with the current touch sensing frequency. Noise that corrupts tixel current $I_t$ 304 can come from a variety of external sources that are not controllable (radio signals, cellular signals, etc.). This external noise can corrupt tixel current $I_t$ 304 at any time. If this external noise is present, chip 326 may need to switch to another touch sensing frequency in response to the external noise even if display data noise is not expected at the current touch sensing frequency. The techniques described above allow chip 326 to avoid switching to a parking frequency that will face display data noise during the next display update.

Figure 7:
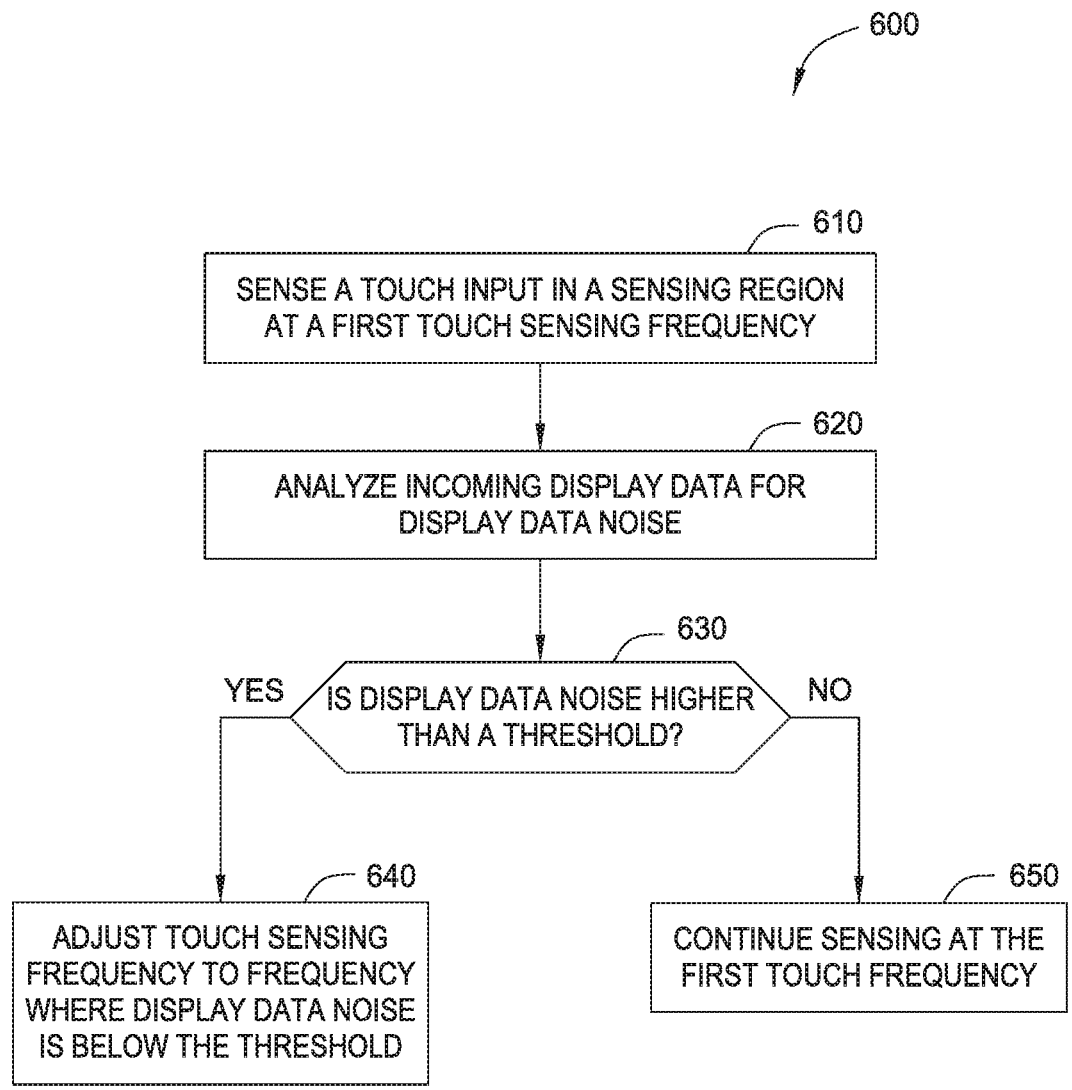
FIG. 7 is a flow diagram illustrating a method for avoiding display noise in a touch sensing device in accordance with one embodiment.

FIG. 7 is a flow diagram illustrating a method 600 for avoiding display noise in a touch sensing device in accordance with one embodiment. Although the method steps are described in conjunction with FIGS. 1-6, persons skilled in the art will understand that any system configured to perform the method steps, in any feasible order, falls within the scope of the present invention. In various embodiments, the hardware and/or software elements described in FIGS. 1-6, or embodied in another suitable device, can be configured to perform the method steps of FIG. 7.

The method 600 begins at step 610, where a touch sensing device senses a touch input in a sensing region 120 at a first touch sensing frequency. The touch sensing device may comprise an array of tixels 302 as described above. Tixels 302 detect the capacitance between an input object 140 and the tixel 302. The capacitance creates an input current that is integrated and transmitted to a processing system for processing. A sensor module such as sensor module 260 may receive the touch input in step 610.

The method 600 proceeds to step 620, where a processor, processing circuitry, or chip such as chip 326 analyzes incoming display data for display data noise at the first touch sensing frequency and at a second touch sensing frequency. The incoming display data may be stored in a buffer before being sent to the display. The touch sensing frequencies that are analyzed are parking frequencies that have been predetermined to be acceptable touch sensing frequencies. The touch sensing frequencies can be analyzed using a Goertzel algorithm. While this example describes a first and a second touch sensing frequency, the display data can be analyzed for any number of touch sensing frequencies by utilizing the Goertzel algorithm for each frequency. For example, a third touch sensing frequency, fourth touch sensing frequency, fifth touch sensing frequency, etc., can also be analyzed for display data noise.

At step 630, processing circuitry determines if the display data noise at the first touch sensing frequency is higher than a predetermined threshold. If the display data noise is higher than the threshold, the method 600 proceeds to step 640 where chip 326 adjusts the touch sensing frequency to the second touch sensing frequency where the display data noise is below the threshold. If more than two touch sensing frequencies are analyzed using the Goertzel algorithm, chip 326 can adjust the touch sensing frequency to any touch sensing frequency where the display data noise is below the threshold. In some embodiments, chip 326 can select the touch sensing frequency that has the lowest predicted display data noise of all the touch sensing frequencies that are analyzed. Any other suitable method may be used to select the new touch sensing frequency.

If, at step 630, the display data noise is lower than the threshold, the method 600 proceeds to step 650 where chip 326 continues sensing at the first touch frequency. Method 600 can be repeated each time the buffer receives new incoming display data.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A method for avoiding display noise in a capacitive touch sensing device, comprising:
    sensing a touch input in a sensing region of an input device at a first touch sensing frequency while, simultaneously updating, at least in part, a display of the input device;
    analyzing incoming display data for display data noise at the first touch sensing frequency and at a second touch sensing frequency;
    if the display data noise at the first touch sensing frequency is higher than a threshold, adjusting touch sensing frequency to the second touch sensing frequency where the display data noise is lower than the threshold; and
    if the display data noise at the first touch sensing frequency is lower than the threshold, continuing sensing at the first touch sensing frequency, wherein the first touch sensing frequency and the second touch sensing frequency are parking frequencies of a display update frequency of the input device.

2. The method of claim 1, where the incoming display data is analyzed for display data noise at the first touch sensing frequency and at the second touch sensing frequency using a Goertzel algorithm.

3. The method of claim 1, where the incoming display data is analyzed for display data noise at a third touch sensing frequency, and:
    if the display data noise at the first touch sensing frequency and the second touch sensing frequency are each higher than the threshold, adjusting the touch sensing frequency to the third touch sensing frequency where the display data noise is lower than the threshold.

4. The method of claim 1, wherein analyzing incoming display data comprises analyzing display data stored in a buffer before the display data is transmitted to a display.

5. The method of claim 1, further comprising:
    while sensing at the first touch sensing frequency, detecting external noise that is higher than the threshold at the first touch sensing frequency; and
    in response to detecting the external noise, adjusting the touch sensing frequency to the second touch sensing frequency where the display data noise is lower than the threshold.

6. The method of claim 1, wherein the display data noise is generated by coupling impedance between sub-pixel routing and touch pixel routing.

7. An input device for capacitive touch sensing, comprising:
    a capacitive touch sensor configured to:
    sense a touch input in a sensing region at a first touch sensing frequency, while, the input device simultaneously updates, at least in part, a display; and
    a processing system configured to:
        analyze incoming display data for display data noise at the first touch sensing frequency and at a second touch sensing frequency;
        if the display data noise at the first touch sensing frequency is higher than a threshold, adjust touch sensing frequency to the second touch sensing frequency where the display data noise is lower than the threshold; and
        if the display data noise at the first touch sensing frequency is lower than the threshold, continue sensing at the first touch sensing frequency,
        wherein the first touch sensing frequency and the second touch sensing frequency are parking frequencies of a display update frequency of the input device.

8. The input device of claim 7, where the processing system is further configured to analyze incoming display data for display data noise at the first touch sensing frequency and at the second touch sensing frequency using a Goertzel algorithm.

9. The input device of claim 7, where the processing system is further configured to:
    analyze incoming display data for display data noise at a third touch sensing frequency; and
    if the display data noise at the first touch sensing frequency and the second touch sensing frequency are each higher than the threshold, adjust the touch sensing frequency to the third touch sensing frequency where the display data noise is lower than the threshold.

10. The input device of claim 7, further comprising a driver module that updates a display with incoming display data while the capacitive touch sensor simultaneously senses touch inputs.

11. The input device of claim 7, wherein the processing system is further configured to analyze incoming display data stored in a buffer before the display data is transmitted to a display.

12. The input device of claim 7, wherein the processing system is further configured to:
while sensing at the first touch sensing frequency, detect external noise that is higher than the threshold at the first touch sensing frequency; and
in response to detecting the external noise, adjust the touch sensing frequency to the second touch sensing frequency where the display data noise is lower than the threshold.

13. The input device of claim 7, wherein display data noise is generated by coupling impedance between sub-pixel routing and touch pixel routing.

14. A processing system for avoiding display noise in a capacitive touch sensing device, the processing system comprising:
a receiver module configured to:
sense a touch input in a sensing region at a first touch sensing frequency while, simultaneously updating, at least in part, a display of the input device; and
processing circuitry configured to:
analyze incoming display data for display data noise at the first touch sensing frequency and at a second touch sensing frequency;
if the display data noise at the first touch sensing frequency is higher than a threshold, adjust touch sensing frequency to the second touch sensing frequency where the display data noise is lower than the threshold; and
if the display data noise at the first touch sensing frequency is lower than the threshold, continue sensing at the first touch sensing frequency,
wherein the first touch sensing frequency and the second touch sensing frequency are parking frequencies of a display update frequency of the input device.

15. The processing system of claim 14, where the processing circuitry is further configured to analyze incoming display data for display data noise at the first touch sensing frequency and at the second touch sensing frequency using a Goertzel algorithm.

16. The processing system of claim 14, where the processing circuitry is further configured to:
analyze incoming display data for display data noise at a third touch sensing frequency; and
if the display data noise at the first touch sensing frequency and the second touch sensing frequency are each higher than the threshold, adjust the touch sensing frequency to the third touch sensing frequency where the display data noise is lower than the threshold.

17. The processing system of claim 14, further comprising a driver module that updates a display with incoming display data while the receiver module simultaneously senses touch inputs.

18. The processing system of claim 14, wherein the processing circuitry is further configured to analyze incoming display data stored in a buffer before the display data is transmitted to a display.

19. The processing system of claim 14, wherein the processing circuitry is further configured to:
while sensing at the first touch sensing frequency, detect external noise at the first touch sensing frequency; and
in response to detecting the external noise, adjust the touch sensing frequency to the second touch sensing frequency where the display data noise is lower than the threshold.

* * * * *